United States Patent [19]
Horn

[11] Patent Number: 6,076,621
[45] Date of Patent: Jun. 20, 2000

[54] MOBILE WORK PLATFORM

[75] Inventor: Gerald H. Horn, Peoria, Ill.

[73] Assignee: Spencer Research and Development, Inc., Morton, Ill.

[21] Appl. No.: 09/074,752

[22] Filed: May 8, 1998

[51] Int. Cl.[7] .................................................. B62D 51/05
[52] U.S. Cl. ........................ 180/19.2; 180/65.6; 180/320
[58] Field of Search .................................. 180/6.5, 19.1, 180/19.2, 19.3, 65.1, 65.6, 320, 402; 280/638; 446/454, 455

[56] References Cited

U.S. PATENT DOCUMENTS

| | | | |
|---|---|---|---|
| 3,731,758 | 5/1973 | Hibma | 180/65.6 |
| 3,876,024 | 4/1975 | Shieman | 180/19.1 |
| 4,053,025 | 10/1977 | Slusarenko . | |
| 4,275,797 | 6/1981 | Johnson . | |
| 4,341,278 | 7/1982 | Meyer | 180/402 |
| 4,475,611 | 10/1984 | Fisher | 180/6.5 |
| 4,511,825 | 4/1985 | Klimo | 318/67 |
| 4,573,941 | 3/1986 | Holden et al. | 446/451 |
| 4,695,266 | 9/1987 | Hui | 446/454 |
| 4,729,444 | 3/1988 | Tubman | 180/9.22 |
| 5,310,018 | 5/1994 | Lahaie . | |

*Primary Examiner*—Daniel G. DePumpo
*Assistant Examiner*—Michael Cuff
*Attorney, Agent, or Firm*—Philip L. Bateman

[57] ABSTRACT

A mobile work platform contains a base having two sections. The first section contains an energy source, a motor, a gearbox, a drive axle, and at least one drive wheel. The second section contains two steerable casters. The second section telescopes relative to the first section so that the distance between the drive axle and the controlled casters, and the length of the base, are variable. The platform also contains two ladders that are removably attached to the base and that and extend upward from the base, an upper horizontal working platform, and a control system for regulating the speed and direction of travel.

7 Claims, 2 Drawing Sheets

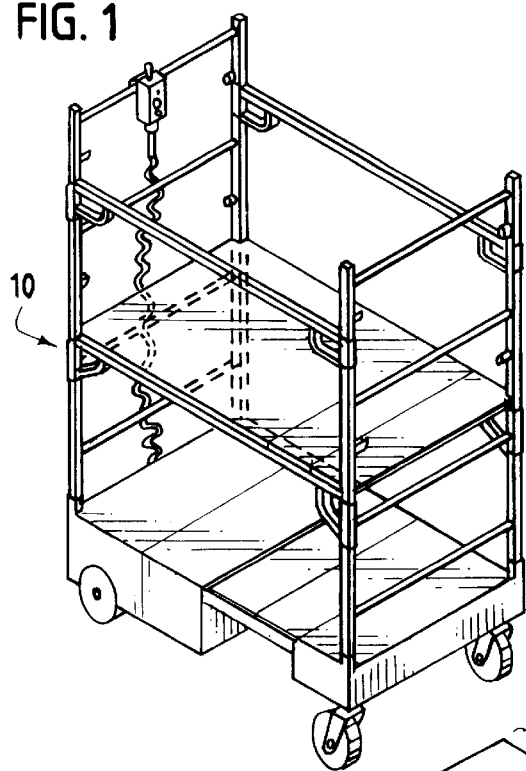
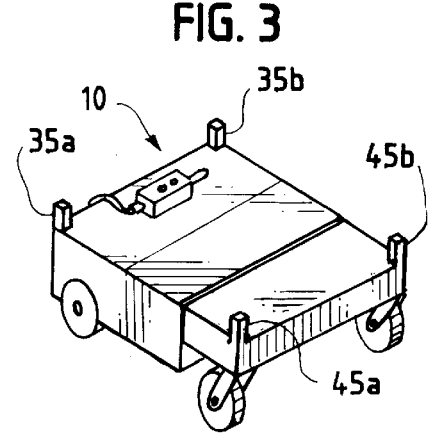
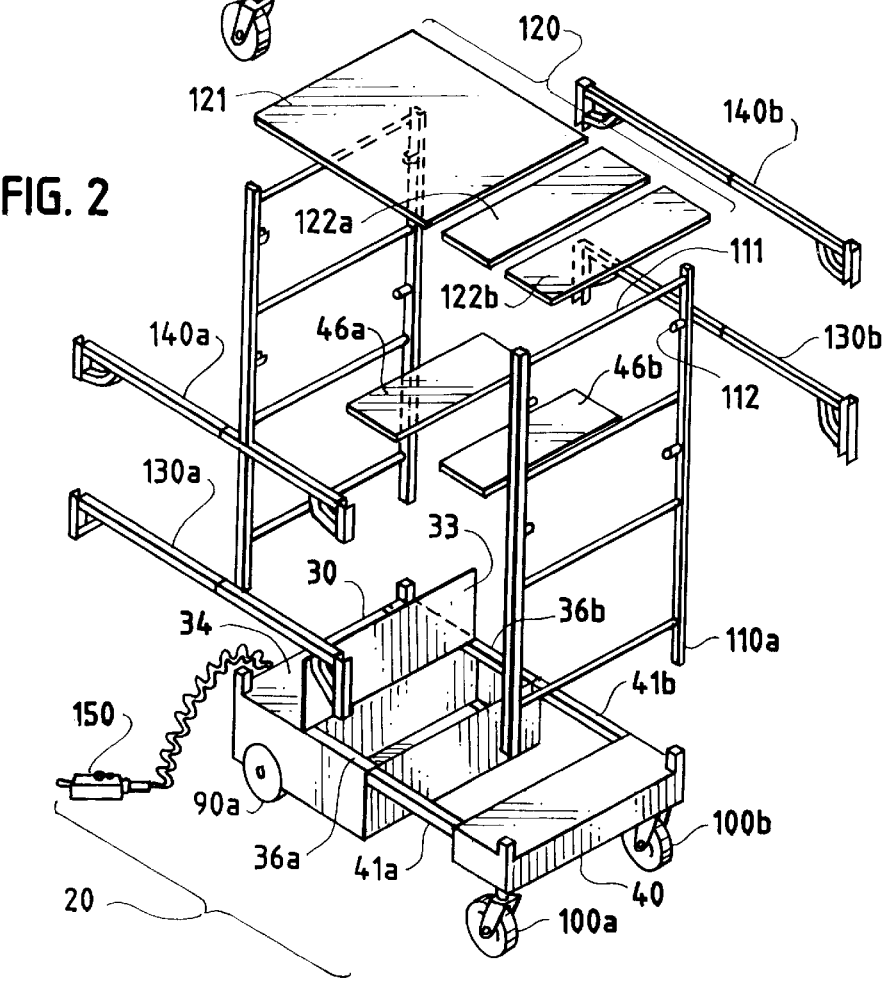

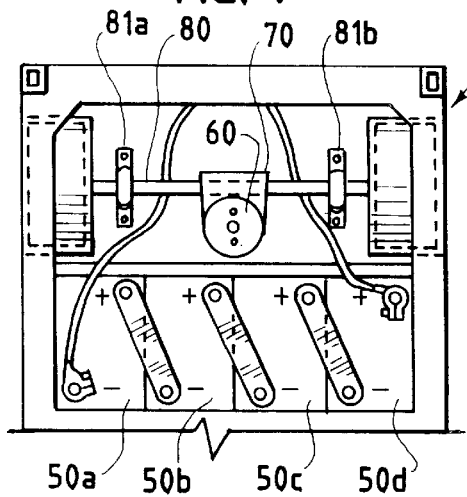
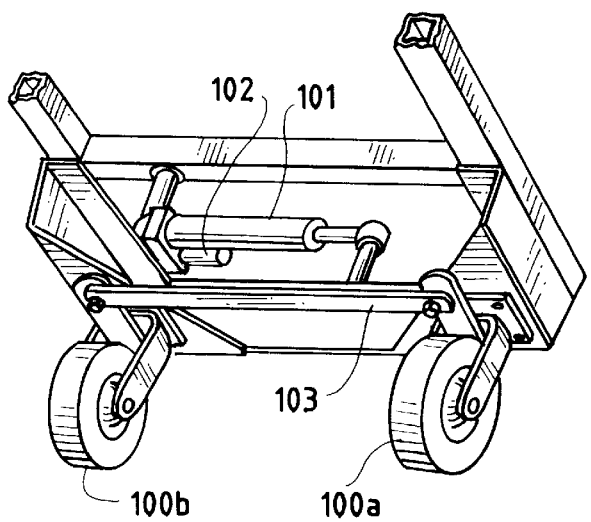
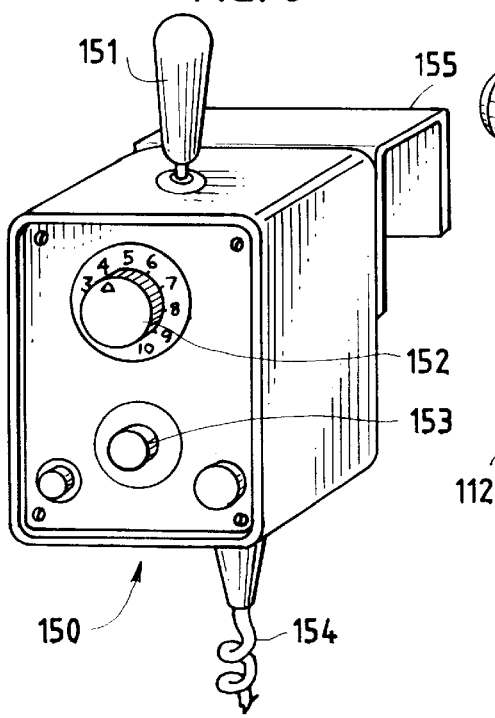
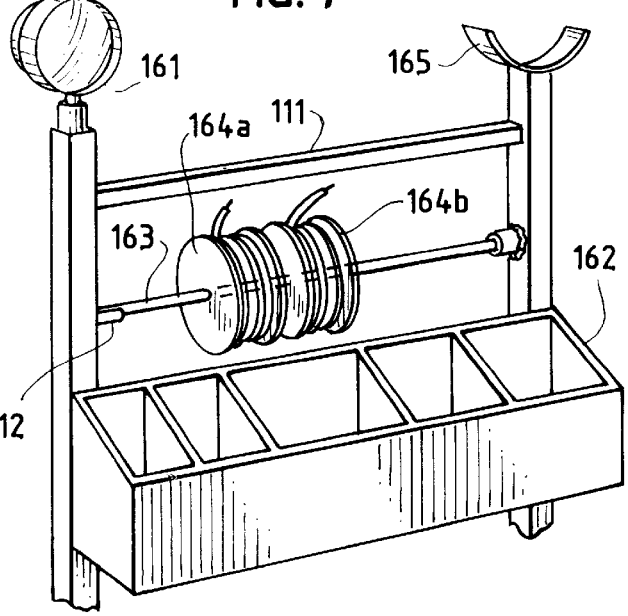
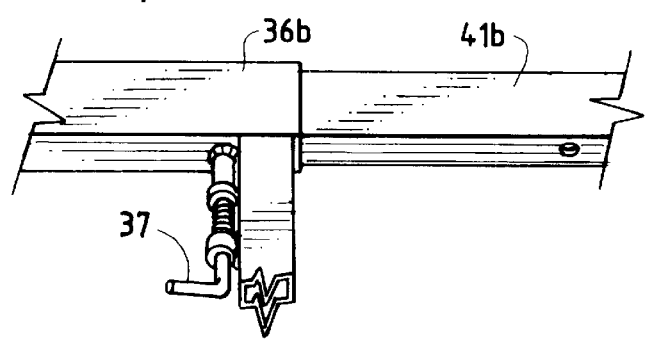

6,076,621

MOBILE WORK PLATFORM

FIELD OF THE INVENTION

This invention relates to work platforms that enable workers to comfortably reach elevated areas.

BACKGROUND OF THE INVENTION

Work at elevated areas about six to twelve feet off the floor is frequently required during new construction and during repairs and maintenance. Ladders are sometimes used to reach elevated work areas, but a worker on a ladder cannot move laterally and prolonged time on a ladder is uncomfortable. For these reasons, the use of scaffolding or other type of elevated horizontal platform is greatly preferred for extended periods of such work.

A popular type of scaffolding used for residential, commercial, and industrial interior construction is commonly known as a Baker scaffold. A Baker scaffold consists of a stackable frame upon which a horizontal platform is placed at the desired height. A Baker scaffold is typically about three feet wide, six feet high, and six feet long. It typically has four wheels and is relatively lightweight to enable it to be manually pushed or carried from one location to another.

When working on a conventional Baker scaffold, the worker must climb down to the floor to move the scaffold to a different location. It would be much more convenient if the worker could move the scaffold while on it. Several different motorized attachments for a Baker scaffold have been disclosed, including those shown in Slusarenko, U.S. Pat. No. 4,053,025, issued Oct. 11, 1977; Johnson, U.S. Pat. No. 4,275,797, issued Jun. 30, 1981; and Fisher, U.S. Pat. No. 4,475,611, issued Oct. 9, 1984. These motorized attachments all suffer from the same disadvantages, they are underpowered, incapable of movement in all directions, and unstable.

Lahaie, U.S. Pat. No. 5,310,018, issued May 10, 1994, discloses a mobile scaffold with four drive wheels that is more substantial than a conventional Baker scaffold. The Lahaie mobile scaffold can move only along one axis, i.e., it cannot move in all directions. It also has a fixed length and width. Therefore, if the Lahaie mobile scaffold is made small enough to fit through small doorways and into elevators, a worker on it has little lateral movement. Conversely, if the scaffold is large enough to provide adequate lateral movement, it will not fit through small doorways or into elevators. Accordingly, a demand exists for a mobile work platform whose length is adjustable, which can travel in all directions, and which can also be used to transport heavy materials.

SUMMARY OF THE INVENTION

The general object of this invention is to provide an improved mobile work platform. A more specific object is to provide a mobile work platform containing upper and lower working platforms. Another more specific object is to provide a mobile work platform whose length is adjustable and which can fit through small openings and into elevators. Another more specific object is to provide a mobile work platform that can move in all directions. Another more specific object is to provide a mobile work platform which can also be used to transport heavy materials.

I have invented a mobile work platform. The work platform comprises: (a) a base having a first horizontal working platform and comprising: (i) a first section with an energy source, a motor energized by the energy source, a gearbox connected to the motor, a drive axle connected to the gearbox, and two rear wheels mounted on the drive axle, at least one of the rear wheels being a drive wheel; (ii) a second section with two steerable casters; and (iii) a means for telescoping the first section relative to the second section so that the distance between the drive axle and the casters, and the length of the base, are variable; (b) two ladders removably attached to, and extending upward from, the base; (c) a second horizontal working platform extending between, and supported by, the ladders; and (d) a control system for regulating the speed and direction of travel of the mobile work platform.

The mobile work platform of this invention is adjustable in length. It can move in all directions and can also be used to transport heavy materials. Work can be performed while standing on either the base platform or on the upper platform. The preferred embodiment of the mobile work platform can fit through small openings and into elevators.

BRIEF DESCRIPTION OF THE DRAWINGS

FIG. 1 is an exploded top, front, and side perspective view of the preferred embodiment of the mobile work platform of this invention.

FIG. 2 is a top, front, and side perspective view thereof in its retracted position without an upper horizontal work platform.

FIG. 3 is a top, front, and side perspective view thereof in its extended position with an upper horizontal work platform.

FIG. 4 is a top plan view of the drivetrain components thereof.

FIG. 5 is a rear elevation view of the steerable casters thereof.

FIG. 6 is a detailed perspective view of the controller thereof.

FIG. 7 is a detailed perspective view of ladder accessories thereof.

FIG. 8 is a detailed perspective view of the telescoping means thereof.

DETAILED DESCRIPTION OF THE INVENTION

This invention is best understood by reference to the drawings. The mobile work platform 10 of this invention contains a base 20 having a lower horizontal working platform. The base is made of two connected sections, a first section 30 and a second section 40. The first section of the base contains the primary drivetrain components—an energy source 50, a motor 60, a gearbox 70, a drive axle 80, and two rear wheels 90a and 90b. The second section of the base contains two steerable casters 100a and 100b. The mobile work platform also contains two ladders 110a and 110b, an upper horizontal platform 120, two platform supports 130a and 130b, two safety rails 140a and 140b, and a controller 150. Each of these components is discussed in turn. As the context requires, the term "platform" is used herein to refer to the entire mobile work platform, the lower horizontal working platform of the base, or the upper horizontal working platform suspended by the ladders.

1. The Base

The first section of the base is generally rectangular in shape with a length of about three feet, a width of about two and one-half feet, and a height of about two feet. The size and shape of the first section is a matter of choice and these dimensions are chosen to enable the platform to fit through doorways and into elevators. The first section is substantially hollow with a steel plate outer shell. The interior is divided into two compartments. The forward compartment 31 is for storage and the rear compartment 32 houses most of the drivetrain and electronic components. The upper surface of the first section contains a hinged door 33 made of aluminum diamond decking plate over the forward compartment. The door can be easily opened to gain access to the compartment and forms part of the platform when closed. The door preferably contains a lock (not shown) so that valuables can be stored in the work platform. The upper surface of the first section also contains a cover 34 made of aluminum diamond decking over the rear compartment. The cover is fastened by screws (not shown) because access to the rear compartment is needed only rarely for service. Posts 35a and 35b are located at the rear corners of the upper surface. As explained below, the corner posts support the ladders which, in turn, support the upper platform.

As seen in FIG. 1, the forward compartment contains two steel square tubes 41a and 41b mounted at the top of each side in a horizontal front-to-back orientation. As explained in detail below, the second section of the base contains mating square tubes 36a and 36b that enable the second section to telescope relative to the first section.

The rear compartment contains the primary drivetrain components. FIG. 4 shows the primary drivetrain components in the rear compartment and omits the electronic components for clarity. Four rechargeable batteries 50a, 50b, 50c, and 50d of the type commonly used in electric golf carts provide the energy source for the platform. The most preferred type of battery is a 6-volt, 225-ampere, 600-deep-cycles battery manufactured by Johnson Controls of Geneva, Ill. and designated model number GC-2. A charging jack and accessory power outlet (not shown) are located on the rear wall of the first section.

The motor 60 is powered by the batteries. The motor is mounted vertically with its output shaft pointing downward. The maximum speed of the motor is about 2000 rpm. The most preferred motor is a 0.5 horsepower, 24 volt motor manufactured by Magneteck of El Paso, Tex. and designated model number 46370-16.

The output shaft of the motor is connected to a double-helical gearbox 70 having a 30:1 reduction ratio. The high gearing ratio makes the platform difficult to move without being powered by the motor. In particular, the work platform will remain stationary at inclines up to about 30 degrees without the need for mechanical brakes or tire stops. The most preferred gearbox is one manufactured by the Hampton Company of Portland, Ore. and designated model number 9117.

A drive axle 80 containing two rear wheels 90a and 90b is connected to the gearbox. The drive axle is supported by bearings 81a and 81b welded to the underside of the section. At least one of the rear wheels is a drive wheel. In the preferred embodiment, one of the rear wheels is a drive wheel and the other rear wheel is selectively free wheeling or drive by energizing a solenoid controlled by the operator. The wheels comprise steel rims and solid rubber tires having a diameter of about ten inches and a tread width of about three inches.

The second section of the base telescopes relative to the first section. In the preferred embodiment, the second section contains two rearwardly-projecting steel square tubes that fit within the receiving tubes mounted in the first section. As best seen in FIG. 8, a spring-loaded pin 37 engages holes in the second section's tube to fix the second section in one of three positions. The first position is completely retracted with the two sections in contact, as shown in FIG. 2. The overall length of the platform in this position is about four feet. The second position (not shown) produces a gap of about one foot between the two sections and results in an overall length of about five feet. A first platform insert 46a is placed into the gap between the sections to create a continuous platform upon which a person can stand and work. The third position is completely extended, as shown in FIGS. 1 and 3. The overall length of the platform in this position is about six feet. A second platform insert 46b is placed into the gap in the completely extended position. The second section contains corner posts 45a and 45b at its front that are similar in construction to the corner posts at the rear of the first section.

The second section also contains two steerable casters 100a and 100b, as best seen in FIG. 5. The casters are similar in construction to the drive wheels, but rotate freely and can be turned from side to side to steer the work platform. The steering mechanism includes an actuator 101, an actuator motor 102, and a linkage bar 103. The actuator motor is responsive to the controller. The actuator retracts to turn the platform to the left and extends to turn the platform to the right.

As previously discussed, the preferred embodiment of the work platform has base sections that telescope by means of two pairs of mating square tubes that fit within each other. Many other telescoping structures are known in the art and are suitable for use. Examples of such suitable telescoping structures include all manner of overlapping and telescoping members, arms, tubes, tracks, channels, plates, and the like.

2. The Upper Platform Assembly

The upper platform assembly contains the upper platform and its supporting structures. The upper platform itself consists of a four-foot-long main platform section 121 and two one-foot-long platform inserts 122a and 122b. One insert is used when the base is telescoped to its five-foot length and both inserts are used when the base is fully extended to its six-foot length. The upper platform is made of a strong, light weight material such as wood, metal, or plastic. Plywood is the most preferred material.

Ladders 110a and 110b slide into and attach to the corner posts on the base. Each ladder is about seven feet in height with rungs 111 at intervals of about one and one-half feet. Each ladder contains about eight spaced-apart holes (not shown) on the inside face for attachment of the platform supports and safety rails.

The platform supports 130a and 130b mount to the ladders with spring-loaded pins and provide the support for the upper platform. Each platform support is made of two overlapping sections so that its length can be adjusted in accordance with the overall length of the base. The platform supports contain an inwardly-projecting shoulder upon which the platform rests. The shoulder is recessed so the platform forms a flush surface with the supports.

The safety rails 140a and 140b mount to the ladders and reduce the possibility of a worker falling off the platform. The safety rails are similar in construction to the platform supports but are generally lighter in weight because they do not have to bear a load.

3. The Control System

The control system for the platform consists of the controller 150 and related electronics that enable the platform to be driven under its own power to the desired location. The controller is shown in detail in FIG. 6. A joystick 151 controls front-to-back and side-to-side movement. As previously discussed, front-to-back movement is accomplished by reversing the direction of rotation of the motor and side-to-side movement is accomplished by moving the actuator for the steerable casters.

A rotating dial 152 controls the speed of the platform. The signal from the dial provides the input to a pulse-type DC drive unit manufactured by Dart Controls of Zionsville, Ind. The output from the DC drive unit is, in turn, fed to the motor. A regenerative braking circuit is included in the control system to immediately stop rotation of the motor when the joystick is moved to the neutral position. A delay circuit prevents the immediate forward or reverse motion of the platform if the joystick is accidentally hit.

A combination running light/kill switch 153 completely shuts off power to the motor when depressed. The controller contains a flexible cord 154 and a hook 155 that enable it to be placed where desired on the platform. The controller can also be held by a person standing on the ground adjacent the platform.

4. Use Of The Mobile Work Platform

The mobile work platform is used whenever and wherever conventional scaffolding is used. To reach relatively low work areas, a worker can simply stand on the upper surface of the base, in other words, on the lower working platform. To reach higher work areas, the upper platform can be placed at heights between about three and six feet, enabling a worker to easily reach work areas between about six and twelve feet off the floor. To reach even higher areas, ladder extensions and outrigger supports are used. The mobile work platform is controlled by a worker standing on the platform or walking alongside it. The platform can also be used as a transport cart.

The utility of the mobile work platform in enhanced by the addition of one or more accessories. Four of the more useful accessories are shown in FIG. 7. A spotlight 161 is inserted into the top of a ladder and provides illumination to the work area. A toolbox 162 adapted to rests on a ladder crossbar provides a convenient storage area for tools and reduces dangerous clutter at the worker's feet. Pairs of U-shaped supports 112 on the ladder uprights hold short sections of pipe 163 through which spools of wire 164a and 165b and the like are placed. Cradle-shaped racks 165 are inserted into the top of a ladder to hold conduit, pipe, etc.

I claim:

1. A mobile work platform comprising:
   (a) a base having a first horizontal working platform and comprising: (i) a first section with an energy source, a motor energized by the energy source, a gearbox connected to the motor, a drive axle connected to the gearbox, and two rear wheels mounted on the drive axle, at least one of the rear wheels being a drive wheel; (ii) a second section with two steerable casters; and (iii) a means for telescoping the first section relative to the second section so that the distance between the drive axle and the casters, and the length of the base, are variable;
   (b) two ladders removably attached to, and extending upward from, the base;
   (c) a second horizontal working platform extending between, and supported by, the ladders; and
   (d) a control system for regulating the speed and direction of travel of the mobile work platform.

2. The mobile work platform of claim 1 wherein the length of the base varies from about four to six feet.

3. The mobile work platform of claim 2 wherein the means for telescoping comprises mating tubes in the first section and second section.

4. The mobile work platform of claim 3 wherein the casters are steered by an actuator and linkage bar.

5. The mobile work platform of claim 4 additionally comprising platform supports extending between the ladders.

6. The mobile work platform of claim 5 additionally comprising safety rails extending between the ladders.

7. The mobile work platform of claim 6 wherein the control system comprises a controller having a joystick.

* * * * *